Jan. 5, 1954   L. R. SCHUESSLER   2,664,815
MACHINE FOR PRINTING AND PERFORATING SALES
TICKETS USING ADDRESS PLATES
Filed Feb. 8, 1951   2 Sheets-Sheet 1
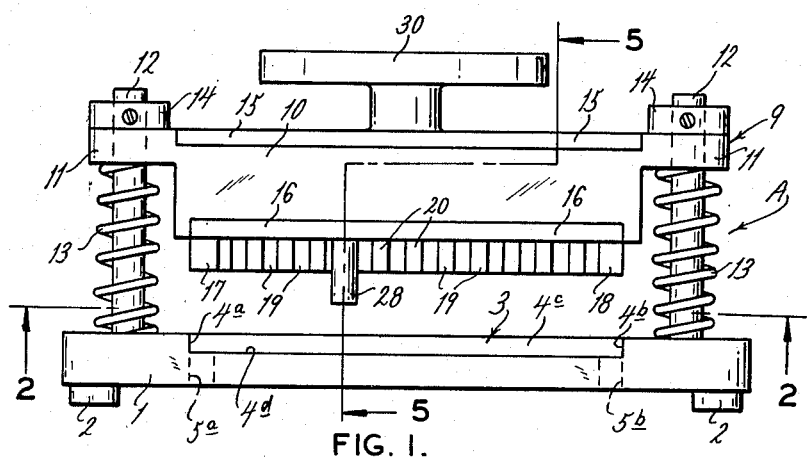
FIG. 1.
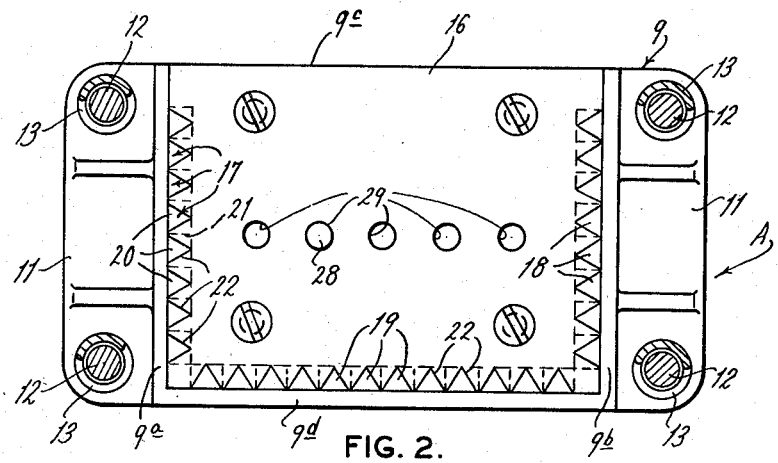
FIG. 2.
FIG. 3.
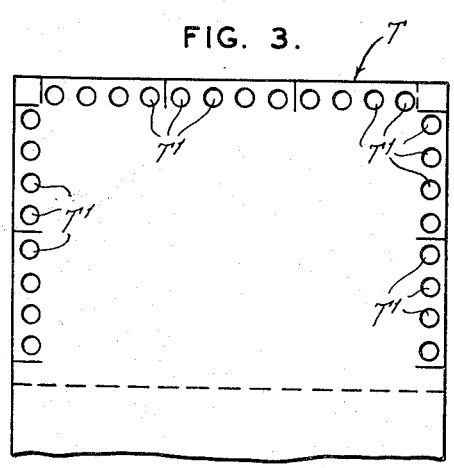
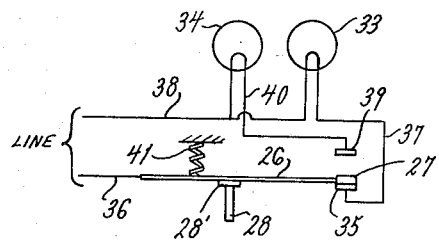
FIG. 9.
INVENTOR.
LEVYN RAY SCHUESSLER
BY
ATTORNEY Jan. 5, 1954
L. R. SCHUESSLER
2,664,815
MACHINE FOR PRINTING AND PERFORATING SALES TICKETS USING ADDRESS PLATES
Filed Feb. 8, 1951
2 Sheets—Sheet 2
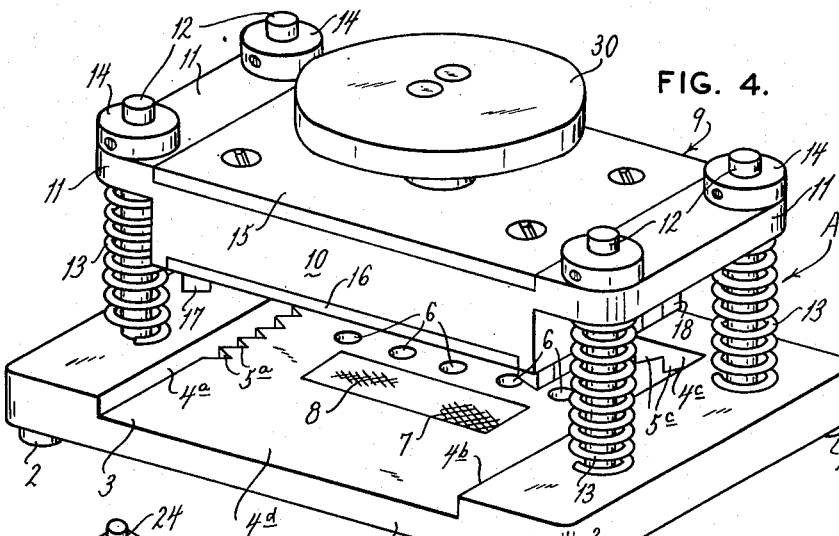
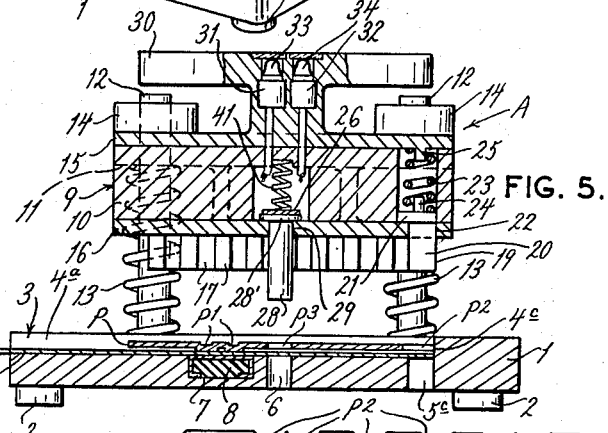
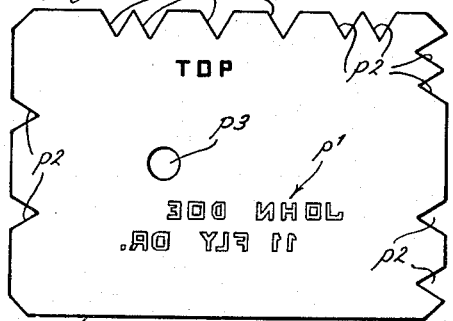
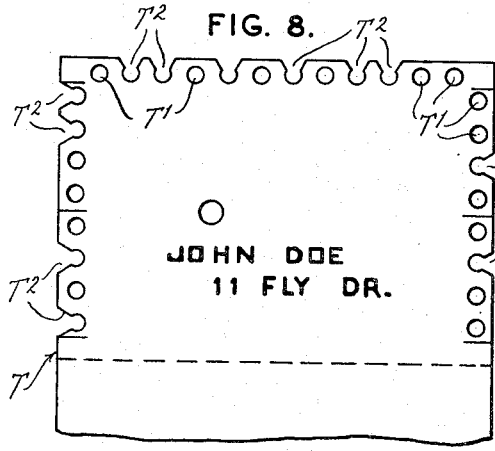
INVENTOR.
LEVYN RAY SCHUESSLER
BY
E. M. Harrington
ATTORNEY Patented Jan. 5, 1954

2,664,815

UNITED STATES PATENT OFFICE 2,664,815

MACHINE FOR PRINTING AND PERFORATING SALES TICKETS USING ADDRESS PLATES

Levyn Ray Schuessler, University City, Mo.

Application February 8, 1951, Serial No. 209,928

4 Claims. (Cl. 101—19)

1

This invention relates generally to perforating machines and more specifically to an improved machine for perforating sales tickets in retail stores, the predominant object of the invention being to provide such a machine which is of unique construction and arrangement and which is capable of performing its intended function in an improved and highly efficient manner.

As is well known to average persons residing in larger cities, it is quite a common practice for retail stores, such as department stores, to supply each store customer having a charge account with a plate on which the customer's name and address appears in raised letters and numbers, and on the various counters of the store machines are arranged which are employed by the sales persons of the store for impressing on sales tickets of customers the name and address appearing on each such customer's plate. The advantage of this system is that much loss of time is avoided because of the fact that a customer need not wait, after making a charge purchase, until the credit department of the store has approved the charge, the fact that the customer possesses a charge plate being sufficient identification of the customer to warrant charging the purchase without referring the charge to the credit department of the store for approval at the time of the purchase. Many of the charge plates heretofore in use had displayed thereonly only the customer's names and addresses, no account number appearing on said charge plates. In the case of the machine of the present invention, however, the sales tickets are so punched as to be provided with code punchings, some of which are circular openings and others of which are circular openings into which slots lead that are open at edge portions of the sales tickets, said slots being cut by the machine of this invention, and the code punchings of the sales tickets serve to permit said sales tickets to be sorted in a well known manner with the aid of sorting needles.

Fig. 1 is a front elevation of the perforating machine of the present invention.

Fig. 2 is a horizontal section taken on line 2—2 of Fig. 1.

Fig. 3 is a fragmentary view showing a sales ticket before being perforated with the aid of the machine of the present invention.

Fig. 4 is a perspective view of the machine illustrated by Figs. 1 and 2.

Fig. 5 is a cross section taken on the staggered line 5—5 of Fig. 1.

Fig. 6 is an enlarged perspective of one of the

2 cutters forming parts of the machine shown in Figs. 1, 2, and 4.

Fig. 7 is a face view of a customer's charge plate employed in use of the machine of this invention.

Fig. 8 is a fragmentary view of a sales ticket after it has been subjected to a perforating operation with the aid of the machine shown in Figs. 1, 2, and 4, and the charge plate shown in Fig. 7.

Fig. 9 is a view of the electrical circuit for the signal means.

In the drawings, wherein is shown for purposes of illustration, merely, one embodiment of the invention, A designates the improved perforating machine generally. The machine A includes a rectangular base member 1 which has mounted thereon at the four corners thereof supporting feet 2. The base member 1 has formed therein at the top thereof a rectangular recess 3 which is open at the front edge of said base member and is defined at its opposed sides and at its rear end by vertical walls 4a, 4b, and 4c. The wall 4d of the recess 3 has formed therein a row 5a of V-shaped apertures which are located in close proximity to the side wall 4a of the recess 3, these apertures extending from the face 4d of the recess through the base member 1 to the bottom face thereof and being open from end to end. In like manner, the base member is provided with a row of similar V-shaped apertures 5b which is located in close proximity to the opposite side wall 4b of the recess 3, and with a row of like V-shaped apertures 5c that is located in close proximity to the rear recess wall 4c. Also, the base member 1 has formed therethrough a plurality of circular openings 6 which are open throughout their lengths and at their opposite ends, and said base member is provided with a recess 7 in which an ink pad 8 is disposed.

The machine A includes a movably supported head 9 that comprises a body portion 10 from which opposed flanges 11 are extended outwardly in opposite directions, there being a plurality of posts 12 that are fixed to and extended upwardly from the base member 1 and extend through openings formed through the flanges 11. Each post 12 is embraced by a coil spring 13 which contacts at its lower end with the top face of the base member 1 and at its upper end with a lower face of a flange 11, each post having fixedly mounted thereon a collar 14 which is contacted by a top face portion of a flange 11 so as to limit upward movement of the movable head 9 of the machine A in response to force exerted by the coil springs 13. The body portion of the movably supported head 9 is provided with opposed end walls 9a and 9b and opposed front and rear walls 9c and 9d, said body portion being closed at its top by a plate 15 and being closed at its bottom by a plate 16 and said plates 15 and 16 are secured in place by suitable fastening devices.

Disposed vertically within the body portion 10 of the movably supported head 9 is a plurality of cutters, there being a row of cutters 17 located adjacent to the end wall 9a of said body portion 10, a row of cutters 18 located adjacent to the opposite end wall 9b of said body portion, and a row of cutters 19 located adjacent to the rear wall 9d of said body portion (Fig. 2). Each of the cutters 17, 18, and 19 is shaped as is shown to good advantage in Fig. 6; that is to say, the lower portion 20 of each cutter is of triangular shape in horizontal section and a rectangular flange portion 21 is disposed immediately above said triangular portion 20. The triangular portion of each cutter extends through a triangular shaped opening 22 formed through the lower plate 16 of the body portion 10 of the movable head 9, each cutter being urged downwardly by a light coil spring 23 which is interposed between a portion of the lower face of the upper plate 15 of the body portion of the movable head 9 and the flange portion 21 of the cutter, and the coil spring of each cutter being centered by a pin 24 extended upwardly from the flange portion 21 of the cutter and a pin 25 extended downwardly from the upper plate 15 (Fig. 5). It is to be noted that when the movable head 9 is moved downwardly to its lower limit of movement, the triangular lower portions of the cutters 17, 18, and 19 may enter the V-shaped apertures 4a, 4b, and 4c.

Disposed within the body portion 10 of the movable head 9 of the machine A is a resilient element 26, formed of electrical conductive material which is anchored in a fixed position at one end thereof and is provided with an electrical contact 27 at its opposite end. The resilient element 26 contacts with the upper flange portion 28' of a plunger 28 (Figs. 5 and 9) which is extended through an opening 29 formed through the lower plate 16 of the body portion 9, said plunger being supported relative to the plate 16 by contact of the lower face of the flange portion 21 of the plunger with a portion of the upper face of said lower plate 16 which surrounds the opening 29. The body portion 10 of the movable head 9 of the machine A is provided with an actuating disk 30 which may be a part of the upper plate 15 of said body portion, and disposed in a cavity formed in said disk structure is a pair of electrical sockets 31 and 32 that support, respectively, a green electric light bulb 33 and a red electric light bulb 34. The electrical contact 27 of the resilient element 26 normally contacts with a contact 35 (Fig. 9) so as to cause current to flow from a source of electrical energy by way of the conductor 36, the resilient element 26 the contacts 27 and 35, and the conductor 37 to the green electric bulb, and back to source from said green electric light bulb by way of the conductor 38. Also, under certain circumstances, which will be hereinafter described in detail, the contact 27 may be moved out of contact with the contact 35, so as to break the electrical circuit to the green electric light bulb, and into contact with the contact 39 so as to complete the electrical circuit to the red electric light bulb, such circuit to the red electric light bulb 34 being by way of the conductor 36, the resilient element 26, the contacts 27 and 39, the conductor 40 to the red electric light bulb 34, and back to source from said red electric light bulb by way of the conductor 38. The resilient element 26 has a coil spring 41 associated therewith which tends to move the free end of said element downwardly.

In the use of the improved machine of this invention each charge customer of a retail store operating under the charge system of which the machine A forms a part is provided with a charge plate, such as that shown in Fig. 7 and designated by the reference character P. The charge plate P is made of metal or other suitable material and it is provided with the name and address of the customer in raised letters and numbers, as is indicated in Fig. 7 at P'. Also, the charge plate P is provided at edges thereof with V-shaped notches P², which are open at said edges of said charge plate, and said charge plate is provided with an aperture P³ formed therethrough. The aperture P³ identifies a particular store with which the customer has a charge account, and if the customer has charge accounts at more than one store his charge plate would be provided with an aperture P³ for each store with which he has a charge account because the apertures P³ which identify different stores are located in different positions with respect to the charge plate P.

Let it be assumed in accordance with this invention that a customer has made a purchase which he wishes to charge. The sales person will make out a sales ticket T which is provided with circular perforations T', as is shown in Fig. 3, and the upper portion of this sales ticket is arranged in the recess 3 of the base member 1 of the machine A, the sales ticket being arranged face down, and the charge plate P is disposed atop the portion of the sales ticket that is disposed in the recess 3. The actuating disk 30 is then moved downwardly, a lower face portion of the movable head contacting with the charge plate P and forcing it into contact with the sales ticket T so that the name and address on the charge plate are impressed with the aid of the ink pad 8 on the sales ticket T. As the movable head 9 moves downwardly, as described, some of the cutters 17, 18, and 19 will strike solid portions of the charge plate and the downward movement of such cutters will be arrested and the coil springs 23 associated with said arrested cutters will be compressed as downward movement of the movable head 9 continues. However, the V-shaped notches P² of the charge plate P are in vertical alinement with certain others of the cutters 17, 18, and 19 and these cutters pass through the V-shaped notches P² alined therewith and cut tapered notches T² in the sales ticket T which open into certain of the perforations T' and are open at edges of said sales ticket (see Fig. 8). Thus, each copy of a sales ticket which remains at the store has the code for the customer's account number cut into edge portions thereof so that an accumulation of sales tickets may be quickly and accurately sorted in accordance with the needle sorting method.

The green electric light bulb 33 normally is lighted during business hours of a store and if the aperture P³ of the charge plate P is properly positioned to identify the store where the purchase is made the plunger 28 will pass downwardly through an aperture 6 formed in the base member 1 of the machine. However, if the aperture P³ is not in the proper position to identify the store where the purchase is being made, downward movement of the plunger 28 will be arrested by contact with a solid portion of the charge plate P, and continued downward movement of the movable head 9 will cause the electrical contact 27 to move out of contact engagement with the contact 35 and into contact engagement with the contact 39 to extinguish the green light 33 and cause the red light 34 to glow, this being a signal to the sales person that charge plate being used in the machine is not a proper charge plate for the store where the purchase is being made. As hereinbefore stated, a customer may have accounts at a number of stores employing the charge system of this invention. When this is so the customer's charge plate will be provided with an aperture identifying each such store. However, the machines A in each store will each be provided with only one plunger 28 and that one plunger will be located so that it will pass through the aperture P³ of the charge plates which identify the particular store in which the machines are used.

I claim:

1. A machine of the class described comprising a base member, a movable head member supported for movement with respect to said fixed member, a plurality of cutters supported by said movable head member for movement therewith and with respect thereto, said base member being adapted to receive a sales ticket, and a plate provided with raised printing portions and having openings formed therethrough through which certain of said cutters may pass to perforate said sales ticket and against solid portions of which certain others of said cutters are adapted to abut so as to arrest movement of the latter cutters with said movable head member and prevent perforation of said sales ticket thereby, and inking means located in said base member in juxtaposition to said sales ticket and said plate and into contact with which said sales ticket is moved in response to movement applied to said plate by said movable head member so as to cause said raised portions of said plate to apply printed matter to said sales ticket.

2. A machine of the class described comprising a base member, a movable head member supported for movement with respect to said fixed member, a plurality of cutters supported by said movable head member for movement therewith and with respect thereto, said base member being provided with a recess adapted to receive a sales ticket, and a removable plate having raised printing portions and having openings formed therethrough through which certain of said cutters may pass to perforate said sales ticket and against solid portions of which certain others of said cutters are adapted to abut so as to arrest movement of the latter cutters with said movable head member and prevent perforation of said sales ticket thereby, and inking means located in said base member in juxtaposition to said sales ticket and said plate and into contact with which said sales ticket is moved in response to movement applied to said plate by said movable head member so as to cause said raised portions of said plate to apply printed matter to said sales ticket.

3. A machine of the class described comprising a base member, a movable head member supported for movement with respect to said fixed member, a plurality of cutters supported by said movable head member for movement therewith and with respect thereto, said base member being adapted to receive a sales ticket, a plate provided with raised printing portions and having openings formed therethrough through which certain of said cutters may pass to perforate said sales ticket and against solid portions of which certain others of said cutters are adapted to abut so as to arrest movement of the latter cutters with said movable head member and prevent perforation of said sales ticket thereby, and inking means located in said base member in juxtaposition to said sales ticket and said plate and into contact with which said sales ticket is moved in response to movement applied to said plate by said movable head member so as to cause said raised portions of said plate to apply printed matter to said sales ticket and signal means for indicating incomplete operation of the machine, said signal means being actuated in response to movement of said movable head member.

4. A machine of the class described comprising a base member, a movable head member supported for movement with respect to said fixed member, a plurality of cutters supported by said movable head member for movement therewith and with respect thereto, said base member being adapted to receive a sales ticket, a plate provided with raised printing portions and having openings formed therethrough through which certain of said cutters may pass to perforate said sales ticket and against solid portions of which certain others of said cutters are adapted to abut so as to arrest movement of the latter cutters with said movable head member and prevent perforation of said sales ticket thereby, and inking means located in said base member in juxtaposition to said sales ticket and said plate and into contact with which said sales ticket is moved in response to movement applied to said plate by said movable head member so as to cause said raised portions of said plate to apply printed matter to said sales ticket and signal means including an electric light bulb for indicating incomplete operation of the machine, said signal means being actuated in response to movement of said movable head member.

LEVYN RAY SCHUESSLER.

References Cited in the file of this patent

UNITED STATES PATENTS

| Number | Name | Date |
|---|---|---|
| Re. 177 | Freeman | Nov. 17, 1936 |
| 1,497,893 | Daubmeyer | June 17, 1924 |
| 1,613,271 | Gollnick et al. | Jan. 4, 1927 |
| 1,651,275 | Hirsch | Nov. 29, 1927 |
| 2,134,815 | Elliott | Nov. 1, 1938 |
| 2,210,779 | Ruche | Aug. 6, 1940 |
| 2,225,313 | McCart | Dec. 17, 1940 |